United States Patent [19]

Kozak et al.

[11] Patent Number: 5,409,737
[45] Date of Patent: Apr. 25, 1995

[54] PROCESS FOR SEPARATING MULTIVALENT METAL IONS FROM AUTODEPOSITION COMPOSITIONS AND PROCESS FOR REGENERATING CHELATING TYPE ION EXCHANGE RESINS USEFUL THEREWITH

[75] Inventors: William G. Kozak, Hatfield, Pa.; Bashir M. Ahmed, Utica, Mich.

[73] Assignee: Henkel Corporation, Plymouth Meeting, Pa.

[21] Appl. No.: 102,662

[22] Filed: Aug. 5, 1993

Related U.S. Application Data

[63] Continuation-in-part of Ser. No. 847,543, Mar. 6, 1992, abandoned.

[51] Int. Cl.$^6$ .............................................. B05D 3/02
[52] U.S. Cl. ................................ 427/435; 427/388.1; 427/388.4; 502/27
[58] Field of Search ............... 427/435, 345, 388.4, 427/388.1; 148/251; 502/27

[56] References Cited

U.S. PATENT DOCUMENTS

| | | | |
|---|---|---|---|
| 3,617,368 | 11/1971 | Gibbs et al. | 117/161 |
| 3,839,097 | 10/1974 | Hall et al. | 148/6.2 |
| 3,922,451 | 11/1975 | Anschutz et al. | 428/35 |
| 4,012,351 | 3/1977 | Hall et al. | 260/29.6 |
| 4,242,379 | 12/1980 | Hall et al. | 427/435 |
| 4,303,704 | 12/1981 | Courduvelis et al. | 427/345 |
| 4,657,788 | 4/1987 | Benton et al. | 427/379 |
| 4,800,106 | 1/1989 | Broadbent | 427/388.4 |
| 5,164,234 | 11/1992 | Siebert | 427/435 |
| 5,248,525 | 9/1993 | Siebert | 427/388.4 |

FOREIGN PATENT DOCUMENTS

| | | |
|---|---|---|
| 2017026 | 5/1990 | Canada . |
| 54-024283 | 2/1979 | Japan . |
| 56-130499 | 10/1980 | Japan . |

OTHER PUBLICATIONS

"Ion-Exchange Separations", R. E. Anderson, Handbook of Separation Techniques for Chemical Engineers (McGraw-Hill, New York, 1979).
Ion Exchange Resins Amberlite® IRC-718 (Rohm & Haas Co., Philadelpha, 1988).
Purolite Ion Exchange Resins, Purolite S-930.
Rhoplex® WL-81 and Rhoplex WL-91, (Rohm & Haas Co., Philadelphia, 1980).
Amberlite® 200, (Rohm & Haas Co., Philadelphia, 1980).
Lewatit TP 207, Mobay Corp., Pittsburgh, Pa. (A division of Bayer USA Inc.).

*Primary Examiner*—Anthony McFarlane
*Attorney, Agent, or Firm*—Ernest G. Szoke; Wayne C. Jaeschke; Norvell E. Wisdom, Jr.

[57] ABSTRACT

The use of chelating type cation exchange resins, particularly those with iminodiacetic acid functionality, to remove dissolved multivalent cations such as iron, zinc, and chromium from used autodeposition compositions permits reuse of the autodeposition compositions without the need for added surfactant and without developing any undesirable graininess or other texture in the coatings formed. The cation exchange resins can be efficiently regenerated with 0.5 to 4% by weight aqueous hydrofluoric acid.

20 Claims, 4 Drawing Sheets

PROCESS FOR SEPARATING MULTIVALENT METAL IONS FROM AUTODEPOSITION COMPOSITIONS AND PROCESS FOR REGENERATING CHELATING TYPE ION EXCHANGE RESINS USEFUL THEREWITH

CROSS-REFERENCE TO RELATED APPLICATION

This application is a continuation-in-part of application Ser. No. 847,543, filed Mar. 6, 1992, now abandoned.

BACKGROUND OF THE INVENTION

1. Field of the Invention

This invention relates to processes for separating from autodeposition compositions dissolved and/or dispersed metal ions having a valence of two or higher (this type of metal ions being briefly denoted hereinafter as "multivalent"), particularly iron, chromium, and/or zinc cations, more particularly iron and zinc. The invention also relates to regenerating to their acid form chelating type cation exchange resins, particularly those containing iminodiacetic acid functional groups, after the cation exchange resins have been at least partially loaded with multivalent metal cations, particularly with iron, chromium, and/or zinc cations. In one embodiment of particular interest, the invention relates to regenerating such ion exchange resins that have been used to remove iron, chromium, and/or zinc cations from autodeposition baths.

2. Statement of Related Art

Autodeposition involves the use of an aqueous resinous coating composition of relatively low solids concentration (usually less than about 10%) to form a coating of relatively high solids concentration (usually greater than about 10%) on a metallic surface immersed therein, with the coating increasing in thickness and areal density (i.e., mass per unit area of coating) the longer the time the metallic surface is immersed in the composition. Autodeposition is somewhat similar to electrodeposition but does not require the aid of external electrical current to cause the resin particles to deposit on the metal surface.

In general, autodepositing compositions are aqueous acid solutions having solid resin particles dispersed therein in very finely divided form. The coating formed while the metal substrate used is immersed in the bath is generally wet and fairly weak, although sufficiently strong to maintain itself against gravity and moderate spraying forces. In this state the coating is described as "uncured". To make an autodeposition coated object suitable for normal practical use, the uncured coating is dried, usually with the aid of heat. The coating is then described as "cured".

Basic constituents of an autodepositing composition are water, resin solids dispersed in the aqueous medium of the composition, and activator, that is, an ingredient or ingredients which convert the composition into one which will form on a metallic surface a resinous coating which increases in thickness or areal density as long as the surface is immersed in the composition. Various types of activators or activating systems are known. The activating system generally comprises an acidic oxidizing system, for example: hydrogen peroxide and HF; $HNO_3$; a ferric ion containing compound and HF; and other combinations of (i) soluble metal containing compounds such as, for example, silver fluoride, ferrous oxide, cupric sulfate, cobaltous nitrate, silver acetate, ferrous phosphate, chromium fluoride, cadmium fluoride, stannous fluoride, lead dioxide, and silver nitrate, in an amount between about 0.025 and about 50 grams per liter (hereinafter often abbreviated as "g/L"), with (ii) one or more acids such as hydrofluoric, sulfuric, hydrochloric, nitric, and phosphoric acids and organic acids such as, for example, acetic, chloroacetic, and trichloroacetic acids.

The use of autodeposition to coat metal objects containing iron, chromium, and/or zinc causes some dissolution of the objects and therefore increases the concentrations of one or more of these ions in the coating bath. Such increased concentrations of these ions, if sufficiently large, causes the baths to produce unsatisfactory coatings or even to coagulate and become unusable. Removal of these accumulating metal ions is therefore necessary to permit prolonged satisfactory use of an autodeposition bath.

U.S. Pat. No. 3,839,097 of Oct. 1, 1974 to Hall et al. teaches the stabilization of autodeposition baths by removing metal ions therefrom with an ion exchange resin, then regenerating the ion exchange resin by treating it with an aqueous solution of a strong acid. The entire specification of this patent, to the extent not inconsistent with any explicit statement herein, is hereby incorporated into this specification by reference. Sulfuric, phosphoric, hydrochloric, and nitric acids are specifically recommended in this reference, with 20% by weight sulfuric acid apparently highly preferred, based on its use in all the examples in which regeneration is described. Similarly, although several types of ion exchange resins are taught by this reference as suitable, only sulfonic acid type resins are used in working examples. This reference teaches that removal of metal cations from an autodeposition bath by use of a cation exchange resin should be supplemented by addition of dispersing agent selected from the group consisting of cationic and amphoteric surfactants and protective colloids to the bath, in order to maintain very long term stability and avoid the development of a grainy or textured appearance of the coatings formed by the bath on metal substrates after the bath has been in contact with a cation exchange resin.

The general use of ion exchange resins has been reviewed by R. E. Anderson in Section 1.12, "Ion-Exchange Separations", in P. A. Schweitzer (ed.), *Handbook of Separation Techniques for Chemical Engineers* (McGraw-Hill, New York 1979). Iminodiacetic acid resins in particular are described on pages 1-384-1-385 in this reference.

A published product Bulletin, *Ion Exchange Resins AMBERLITE® IRC-718* (Rohm & Haas Co., Philadelphia, 1988), is believed to be typical of current manufacturers' recommendations for use and regeneration of commercial iminodiacetic acid functional resins. This shows that, at pH 2, ferric iron ions are the most tightly bound to this resin of all commonly occurring cations and states that, for regeneration, "the amount of acid required is higher than that required for conventional weakly acidic ion exchange resins. A regeneration level of 6 to 10 lbs. HCl/ft$^3$ may be sufficient for metals with moderate selectivity, but this should be increased slightly for tightly held metals. . . . Acid concentration should be 5 to 15 percent, with higher concentrations needed for more tightly bound species."

Published Canadian Patent Application 2,017,026 describes extraction of iron and other metals from electrodeposition baths using iminodiacetic acid type ion exchange resins. This reference teaches (page 5) that the resins may be regenerated with 20% by weight sulfuric acid solution in water, but otherwise devotes little attention to the regeneration step.

U.S. Pat. No. 4,303,704 of Dec. 1, 1981 to Courduvelis et al. teaches removing complexed copper or nickel from aqueous solutions by passage through a bed of iminodiacetic acid type ion exchange resin. This teaches that, "Preferably, a 0.5 to 20% solution of sulfuric acid or other strong acid is used as the eluent."

Japanese Laid Open Application No. 54-24,283, according to an abstract thereof, teaches regenerating ion exchange resins suitable for removing iron compounds from aqueous solutions, using as regenerant an aqueous solution of an aminopolycarboxylic acid, such as hydroxyethylethylene-diaminetriacetic acid, nitrilotriacetic acid, cyclohexanediaminetetraacetic acid, or a water soluble salt of such an acid.

DESCRIPTION OF THE INVENTION

Except in the claims and the operating examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred, however. Also, unless expressly stated to the contrary: percent, "parts of", and ratio values are by weight; the term "polymer" includes oligomer; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; specification of materials in ionic form implies the presence of sufficient counterions to produce electrical neutrality for the composition as a whole; and any counterions thus implicitly specified should preferably be selected from among other constituents explicitly specified in ionic form, to the extent possible; otherwise such counterions may be freely selected, except for avoiding counterions that act adversely to the objects of the invention.

OBJECTIONS OF THE INVENTION

One object of this invention is to provide an improved means for separating multivalent metal cations, particularly iron, zinc, and chromium cations, more particularly iron and zinc cations, still more particularly iron cations, from autodeposition baths (an alternative term for autodeposition compositions) that have been used to coat active metal objects that introduce such metal cations into the baths, in order to permit prolonged use of the autodeposition baths by replacing their content of resin and other components that are actually incorporated into the autodeposited coatings formed by the baths or are consumed by the chemical reactions that accompany formation of the autodeposited coatings. Another object of the invention is to provide a more economical method of regenerating cation exchange resins, especially chelating type cation exchange resins, more particularly those with iminodiacetic acid functional groups, after the cation exchange resins have been loaded with metal ions of one or more of the types strongly bound by the resins. Still another object is to provide a method of regenerating cation exchange resins that will substantially reduce or eliminate the introduction of unwanted chemical species into autodeposition baths that are subsequently contacted with the regenerated cation exchange resins. Other objects will become apparent from the description below.

SUMMARY OF THE INVENTION

It has surprisingly been discovered that when chelating type cation exchange resins are used to remove iron, chromium, and/or zinc cations from used autodeposition baths, especially those in which hydrofluoric acid is the principal source of acidity, there is no need for addition of dispersing agent as taught by Hall to prevent the development of a grainy and/or textured appearance of the objects subsequently coated with the reused baths. More specifically, one preferred embodiment of the invention is a process comprising steps of:

(I) contacting a metal surface selected from the group consisting of ferriferous and zinciferous metal surfaces with an autodeposition composition comprising, preferably consisting essentially of, or still more preferably consisting of, water and:

(A) from 5 to 550, more preferably from 30 to 300, still more preferably from 40 to 120, and most preferably from 40 to 80, g/L of a stably dispersed organic coating resin;

(B) from about 0.4 to about 5, more preferably from 0.5 to 4.0, still more preferably from 1.0 to 3.0, g/L of fluoride ions;

(C) an amount sufficient to provide from about 0.010 to about 0.20, more preferably from 0.011 to 0.09, still more preferably from 0.012 to 0.045, oxidizing equivalents per liter of an oxidizing agent selected from the group consisting, of dichromate, hydrogen peroxide, ferric ions, and mixtures thereof; and (D) a source of hydrogen ions in an amount sufficient to impart to the autodeposition composition a pH in the range from 1.6 to 3.8, more preferably from 1.7 to 3.0, still more preferably from 1.8 to 2.5, said contacting being continued for a sufficient time that the metal surface contacted is covered with a film containing the organic coating resin, said film being sufficiently adherent to the metal surface to resist flowing off under the influence of gravity when the coated metal surface is removed from contact with the autodeposition composition and forming a smooth coating on the metal surface after drying thereon;

(II) contacting at least 30%, more preferably at least 55%, still more preferably at least 90%, of the total volume of the autodeposition bath from the end of step (I), without adding a dispersing agent selected from the group consisting of cationic and amphoteric surfactants and protective colloids thereto, with a sufficient amount of an acid form chelating cation exchange resin to transfer from the autodeposition bath to the ion exchange resin at least part of the total content of dissolved iron, chromium, and zinc cations in the autodeposition bath and substitute an amount equivalent thereto of dissolved hydrogen ions in the autodeposition bath; and (III) contacting the autodeposition batch from the end of step (II) with additional metal surface selected from the group consisting of ferriferous and zinciferous metal surfaces, so as to form on the additional metal surfaces a coating that is smooth after drying.

Also surprisingly, it has been discovered that at least zinc and iron cations can be more efficiently removed from cation exchange resins by relatively dilute sulfuric acid, hydrochloric acid and, most preferably, hydrofluoric acid regenerants, than by more concentrated and/or stronger acid regenerants, when efficiency is measured by the ratio of equivalents of multivalent ions displaced from the loaded ion exchange resin to the equivalents of hydrogen ions present in the volume of regenerant used. More specifically, a second preferred embodiment of the invention is a process comprising steps of:

(I) providing a wet bed of iminodiacetic acid cation exchange resin containing between 0.10 and 0.30 millimoles per milliliter of wet resin bed volume of a total of iron, chromium, and zinc cations bound thereon by exchange from a solution earlier contacted with the, cation exchange resin predominantly in its acid form, the volume being measured when the bed of resin in its sodium form has settled to its equilibrium volume under the influence of natural gravity and mild mechanical agitation, in the absence of any flow of liquid through the bed; and the liquid with which the bed is wet being formed by washing the bed with from 0.5 to 4, more preferably with from 1 to 3, total bed volumes of deionized water after the passage of any other liquid through the bed; and (II) adding to the top of the wet bed provided in step (I) a volume of an aqueous acidic regenerant liquid consisting essentially of water and an acid component selected from the group consisting of sulfuric acid, hydrofluoric acid, hydrochloric acid, and mixtures thereof, so as to cause a volume of eluted liquid equal to the volume of regenerant liquid added to flow from the bottom of the wet bed, the volume and composition of the regenerant liquid being selected so that the total volume of eluted liquid contains at least 0.080 millimoles per milliliter of wet resin bed volume of a total of iron, chromium, and zinc cations dissolved therein and the total moles of iron, chromium, and zinc cations displaced from binding to the cation exchange resin into the total volume of eluted liquid is at least equal to 0.070 times the number of equivalents of acid in the total volume of regenerant liquid added to the wet bed.

The description immediately above, and other detailed descriptions below, of the processes of using and regenerating a bed of ion exchange resin are based on an assumption that traditional methods of causing liquid to flow through such a bed in one direction only, except for occasional backflushing, would be used. However, it is recognized that some more modern practice involves flowing the liquid containing the ions of major interest to be exchanged, the autodeposition bath in this instance, in one direction through the bed and the regenerant liquid in the opposite direction—a method often denoted by the word "countercurrent". Operation in this manner is also within the intended scope of the invention, and the detailed descriptions herein, with changes in detail having been made in a manner known to those skilled in the art, will also describe such countercurrent operation of a process according to the invention.

In autodeposition baths to be used for coating ferriferous and/or zinciferous surfaces, it is preferred, with increasing preference in the order given that the baths contain a total of no more than 1, 0.3, 0.1, 0.05, 0.009, or 0.004 g/L of anions other than fluoride and surfactant anions. If any acid other than hydrofluoric acid, or any regenerant composition that contains any substantial amount of anions other than fluoride, is used to regenerate a cation exchange resin used to separate multivalent cations from such autodeposition baths, there is danger of contamination of the bath. Accordingly, a third preferred embodiment of the invention is a process comprising steps of:

(I) contacting a metal surface selected from the group consisting of ferriferous and zinciferous metal surfaces with an autodeposition composition comprising not more than 1 g/L in total of anions other than fluoride and surfactant anions, said contacting being continued for a sufficient time that the metal surface or surfaces contacted are covered with a film containing the organic coating resin, said film being sufficiently adherent to the metal surface to resist flowing off under the influence of gravity when the coated metal surface is removed from contact with the autodeposition composition and forming a smooth coating on the metal surface after drying thereon;

(II) contacting at least 30%, more preferably at least 55%, still more preferably at least 90%, of the total volume of the autodeposition bath from the end of step (I), without adding thereto any dispersing agent selected from the group consisting of cationic and amphoteric surfactants and protective colloids, with a sufficient amount of an acid form cation exchange resin to transfer from the autodeposition bath to the cation exchange resin at least part of the total content of dissolved iron, chromium, and zinc cations in the autodeposition bath and substitute an amount equivalent thereto of dissolved hydrogen ions in the autodeposition bath;

(III) separating the cation exchange resin used in step (II) from the autodeposition bath contacted with said cation exchange resin in step (II);

(IV) contacting the separated cation exchange resin from step (III) with an aqueous acidic liquid consisting essentially of water and hydrofluoric acid in sufficient quantity for a sufficient time to displace at least a part of the multivalent metal ions therefrom and thereby regenerate the exchange capacity of the cation exchange resin; and (V) contacting an autodeposition bath comprising cations selected from the group consisting of iron, chromium, and zinc cations and not more than 1 g/L in total of anions other than fluoride and surfactant anions, without adding thereto any dispersing agent selected from the group consisting of cationic and amphoteric surfactants and protective colloids, with the regenerated acid form cation exchange resin from step (V) for a sufficient time to transfer from the autodeposition bath to the ion exchange resin at least part of the content of dissolved iron, chromium, and zinc cations in the autodeposition bath and substitute an equivalent amount thereto of dissolved hydrogen ions in the autodeposition bath; and, optionally, (VI) contacting the autodeposition bath from the end of step (V) with a metal surface selected from the group consisting of ferriferous and zinciferous metal surfaces for a sufficient time that the metal surface contacted is covered with a film containing the organic coating resin, said film being sufficiently adherent to the metal surface to resist flowing off under the influence of gravity when the coated metal surface is removed from contact with the autodeposition composition and forming a smooth coating on the metal surface after drying thereon.

The combination of these discoveries permits a very efficient and economical recycling of the autodeposition baths.

DESCRIPTION OF PREFERRED EMBODIMENTS

The preferred type of ion exchange resin for use with this invention is one having iminodiacetic acid functional groups. Suitable commercial examples include AMBERLITE ® IRC-718, described by its supplier as having a "macroreticular" structure; LEWATIT TM TP-207, described by its supplier, Miles, Inc., as "macroporous"; and PUROLITE TM S-930, also described as "macroporous" by its supplier, Purolite Company. It is expected that other products of the same type would be equally satisfactory.

Cation exchange resins such as those described above are commonly supplied commercially in the sodium form. Before using them in a process according to this invention for extracting multivalent metal ions from autodeposition baths, it is highly preferred to convert them into the acid form, in order to avoid the generally undesired introduction of sodium ions into the baths. This conversion to the acid form may be accomplished by means known per se in the art, for example by treatment with any adequately strong acid.

After conversion to the acid form, it is preferred to rinse the acid form resin with water, preferably deionized, distilled, or otherwise purified water, before using it for extracting multivalent metal ions from an autodeposition bath, even if the acid used to put the ion exchange resin into the acid form is the same as the one used in the autodeposition composition to be treated with the bath. The reason for this preference is that experience has shown that the amount of acid remaining in contact with a wet bed of acid form ion exchange resin, when practical concentrations of aqueous acid are used to put the ion exchange resin into acid form, is usually in excess of the amount needed to regenerate the autodeposition composition to be contacted with the acid form ion exchange resin for removal of multivalent metal ions. Therefore, if there is no rinsing before using the acid form ion exchange resin, more acid than is needed will be introduced into the autodeposition composition, so that it will eventually become unsuitable for use for that reason.

It is also preferred to use the same acid(s) as used in the autodeposition composition to be treated for converting the ion exchange resin to acid form, or for regenerating it after use, in order to avoid introduction into the autodeposition bath of any substantial amounts of anions other than those originally present in the autodeposition bath.

As with other uses of ion exchange resins, it is generally preferred with this invention to use the ion exchange resins in the form of a bed formed by settling of the beads or particles of resin as supplied by the manufacturer into a container with sidewalls impervious to liquids but a bottom at least partially pervious to liquids. Gentle tapping or vibration of the container is generally used to help the formation of a desirably compact bed of the ion exchange resin. Liquids, such as the autodeposition composition, that contain cations to be removed are passed through such beds until some desired fraction of the capacity of the resin for the ions to be removed is reached. A regenerant acid liquid is then passed through the bed, and after enough of the multivalent metal cations have been displaced, the ion exchange resin bed is ready for use again to remove multivalent metal ions. Ordinarily it is preferred to rinse the bed of ion exchange resin with water, preferably with deionized, distilled, or other purified water, between each of these stages of use of the bed. The rinses and eluates from the various stages may advantageously be at least partially recycled for use in a manner known per se, and some cases it may be possible to eliminate some of the intermediate rinses by control of the concentrations of regenerants and other liquid compositions used, for example, so that the amount of acid remaining in equilibrium with the ion exchange resin after regenerating the resin corresponds sufficiently closely to the amount needed to replenish the autodeposition bath.

The total volume of cation exchange resin used in a process according to this invention is measured when needed by allowing the resin particles in their sodium form, wet with a suitable liquid, to settle into a bed in a container under the influence of natural gravity and gentle tapping or vibration of the container, and then discontinuing any net flow of liquid through the bed. The minimum bulk container volume required to contain the amount of ion exchange resin used under such conditions is taken as the volume of the ion exchange resin for purposes of any quantitative descriptions of the volume of ion exchange resin herein.

The conditions and compositions used for coating metal substrates by autodeposition in a process according to this invention are generally those already known in the art. Specific preferred conditions are described below.

One preferred type of coating resin for use in forming autodeposited coatings in a process according to the present invention comprise internally stabilized vinylidene chloride copolymers or externally stabilized vinylidene chloride copolymers containing in excess of 50%, or more preferably at least 80%, of residues from polymerizing vinylidene chloride. Most preferably, the vinylidene chloride copolymer is crystalline in nature. Exemplary crystalline resins are described in U.S. Pat. Nos. 3,922,451 and 3,617,368. Generally speaking, crystalline poly{vinylidene chloride} containing resins comprise a relatively high proportion of residues from vinylidene chloride, for example, at least about 80% by weight thereof.

A preferred winking autodepositing bath containing a commercially available poly{vinylidene chloride} resin has the following composition, designated Bath Composition I:

| Ingredient | Amount (in Parts, 100% Active Ingredients Basis) |
| --- | --- |
| Vinylidene chloride-acrylonitrile-butyl acrylate copolymer latex | 50.00 |
| Dodecyl diphenyloxide disulfonate surfactant | 0.14 |
| Colloidal carbon black pigment | 1.88 |
| Ferric fluoride | 3.00 |
| Hydrofluoric acid | 1.40 |
| Deionized water | balance to make one liter of bath. |

Examples of latexes for suitable use in this composition are commercially available and include the SERFENE® latexes available from Morton Chemical, DARAN® 112 and DARAN® SL 143 available from W. R. Grace, 76 RES 5517 available from Unocal and the HALOFLEX® latexes such as, for example, HALOFLEX® 202 available from Imperial Chemicals Industries. Examples of colloidal carbon black pigment dispersions suitable for use in the composition include RAVEN BLACK® 1035 available from Columbian Chemicals Co., T-2166A available from ABCO Enterprises, Inc., AQUABLACK® 255 and AQUABLACK® 115A available from Borden Chemical Co.

A second preferred type of resin for use in autodeposition coating in connection with this invention is the acrylic type, particularly copolymers of acrylonitrile. A preferred working autodepositing bath containing a commercially available acrylic resin has the following composition, designated Bath Composition II:

| Ingredient | Amount (in Parts, 100% Active Ingredients Basis) |
| --- | --- |
| Acrylic resin latex | 58.00 |
| Dodecyl diphenyloxide disulfonate surfactant | 0.14 |
| TEXANOL ™ | 12.20 |
| Colloidal carbon black pigment | 1.88 |
| Ferric fluoride | 3.00 |
| Hydrofluoric acid | 1.40 |
| Deionized water | balance to make one liter of bath. |

Examples of commercially available latexes for suitable use in this composition include NACRYLIC® 78-6334 and NACRYLIC® 78-6408 from National Starch Co.; NEOACRYL® A-640 from Imperial Chemicals Industries; RHOPLEX® WL-91 and RHOPLEX® B-85 from Rohm and Haas Co.; 76 RES 1018 from Unocal. Examples of colloidal carbon black are the same as those listed above. TEXANOL TM is available from Eastman Chemical Products, Inc. and is reported by its supplier to consist substantially of 2,2,4-trimethyl-1,3-pentanediol monoisobutyrate.

Preferably the concentration of dissolved iron, which is usually in the ferric form in autodeposition compositions of the preferred type, should not be allowed to become greater than 4, or more preferably not greater than 2.0 g/L during the operation of a process according to this invention; the concentration of dissolved zinc cations should not be allowed to become greater than 3, or more preferably not greater than 1.0, g/L during the operation of a process according to this invention; and the concentration of dissolved chromium cations should not be allowed to become greater than 2, or more preferably not greater than 0.5, g/L during the operation of a process according to this invention. Maintenance of dissolved multivalent cation levels below their desired limits can be assured by contacting the entire autodeposition composition, or usually more conveniently a part of it within a given time interval, with an acid form cation exchange resin and then returning the thus "purified" autodeposition composition for use in coating additional metal surfaces. Means of accomplishing such purification processes batchwise or continuously are generally known in the art and will not be considered in detail here. Instead, the focus will be on a major point of operational novelty of the present processes, the use and regeneration of cation ion exchange resins, preferably those of the chelating type, particularly the highly preferred iminodiacetic acid type.

When any fixed volume of a cation exchange resin is contacted with increasing volumes of a specified liquid composition containing exchangeable cations, the volume of cation exchange resin will eventually become saturated with the exchangeable ions and will no longer remove any such ions from any additional volume of the specified liquid composition until the ion exchange resin is regenerated by contact with a regenerant liquid containing ions of a different type from those exchanged with the first specified liquid composition. The amount of cations per unit volume of resin present after such saturation of the ion exchange, resin is generally known in the art as the "saturation capacity" of the resin, in contrast to a "working capacity" that depends on how an actual process is operated. The saturation capacity is often assumed, particularly when dealing with relatively simple solutions such as natural waters to be softened or otherwise purified, to be independent of the composition used to load the resin. In fact, however, the saturation capacity of an ion exchange resin for a particular type or mixture of types of cations often depends on the liquid composition used to load it with these cations. In connection with this process, it is particularly important to note that the capacity values specified below must be defined in connection with the autodeposition composition used with the exchange resin, as it has been found that the actual capacities of the ion exchange resins for iron and zinc in particular, when the capacity is determined with actual used or simulated used autodeposition compositions, can be substantially lower than the; nominal values given by manufacturers of the ion exchange resins, these manufacturers' values being normally based on sodium exchange. The saturation capacity of iminodiacetic acid resins in particular is very sensitive to pH of the solutions used to load the resins with multivalent ions.

When the ion exchange resin used in a process according to this invention has been loaded to a point within the range of from 50-99, more preferably from 75-95, or still more preferably from 75 to 90, percent of its saturation capacity for the ions that are desired to be removed from the autodeposition compositions used in the same process according to the invention, the ion exchange resin is ready for the regeneration step of the process. Alternatively, when compositions and other operating parameters have been sufficiently reliably established by experience with particular autodeposition compositions and loads of substrate surfaces to be coated, and the ion exchange resin is used in a bed as described above, regeneration can be based on the number of bed volumes of used autodeposition composition passed through the bed of ion exchange resin.

The practice of the invention may be further appreciated from the following working examples and from the disclosure of application Ser. No. 08/008,956, filed Jan. 26, 1993, the entire disclosure of which is hereby incorporated herein by reference.

Examples and Comparison Examples Group 1

The following laboratory tests were carried out in an attempt to determine the optimum conditions for regeneration. A large sample of AMBERLITE® IRC-718 cation exchange resin was saturated with iron by passing through it 10 bed volumes of a simulated used autodeposition composition having the same ingredients as Bath Composition I already given above, except that the amount of ferric fluoride was increased to give a concentration of 2 g/L of iron cations. The resin thus loaded was then rinsed with deionized water until the effluent was free of visible latex. The solution in the wet bed was sampled and found to contain 0.060 g/L of iron. The resin contained 0.13 millimoles of iron per milliliter (hereinafter abbreviated "ml") of resin, as measured by the maximum amount that could be eluted with any of the acids described below.

Samples of 60–61 of this loaded and rinsed resin were then placed in a conventional lab container for ion exchange resins to give a bed depth of 45 centimeters and subjected to successive elution with six successive increments, of 20 ml volume per increment, of the nine specified regenerant acid compositions as follows: 0.25, 1.0, and 5.20N aqueous solutions of each of sulfuric, hydrochloric, and hydrofluoric acids. (In calculating the normalities, sulfuric acid was assumed to ionize both protons completely and hydrofluoric and hydrochloric acids to ionize their protons completely.)

The effluents from the columns after each such increment were collected and analyzed for iron content by atomic absorption spectroscopy. The amounts of iron found were corrected for the amount present in the liquid in which the ion exchange resin was immersed; the correction factors were determined in a control experiment by measuring the amount of chloride ions eluted from fresh ion exchange resin in the sodium form, immersed in deionized water, in a bed of the same size by 1.0N aqueous NaCl solution, and calculating therefrom the fraction of the eluate in each increment that was derived from the eluant rather than from the solution in contact with the ion exchange resin in the wet bed. The fraction of eluate derived from the eluant was thereby determined to be 0.0 for the first increment, 0.12 for the second increment, 0.92 for the third increment, and 1.0 for all subsequent increments.

Figure 1:
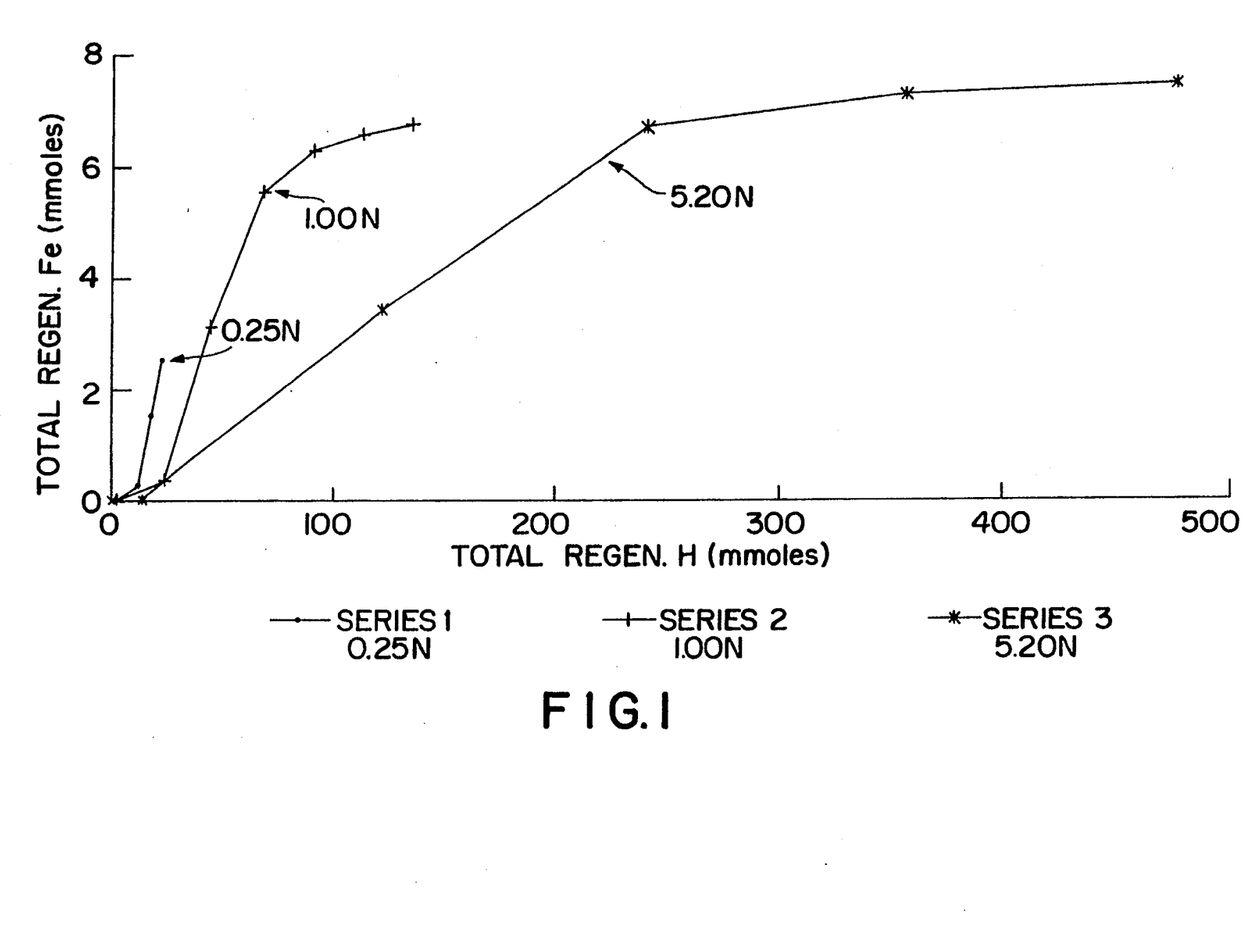
FIGS. 1-3 are all graphs illustrating some important characteristics of some specific cation exchange resin regeneration processes according to the invention and other specific regeneration processes according to prior art.
Figure 2:
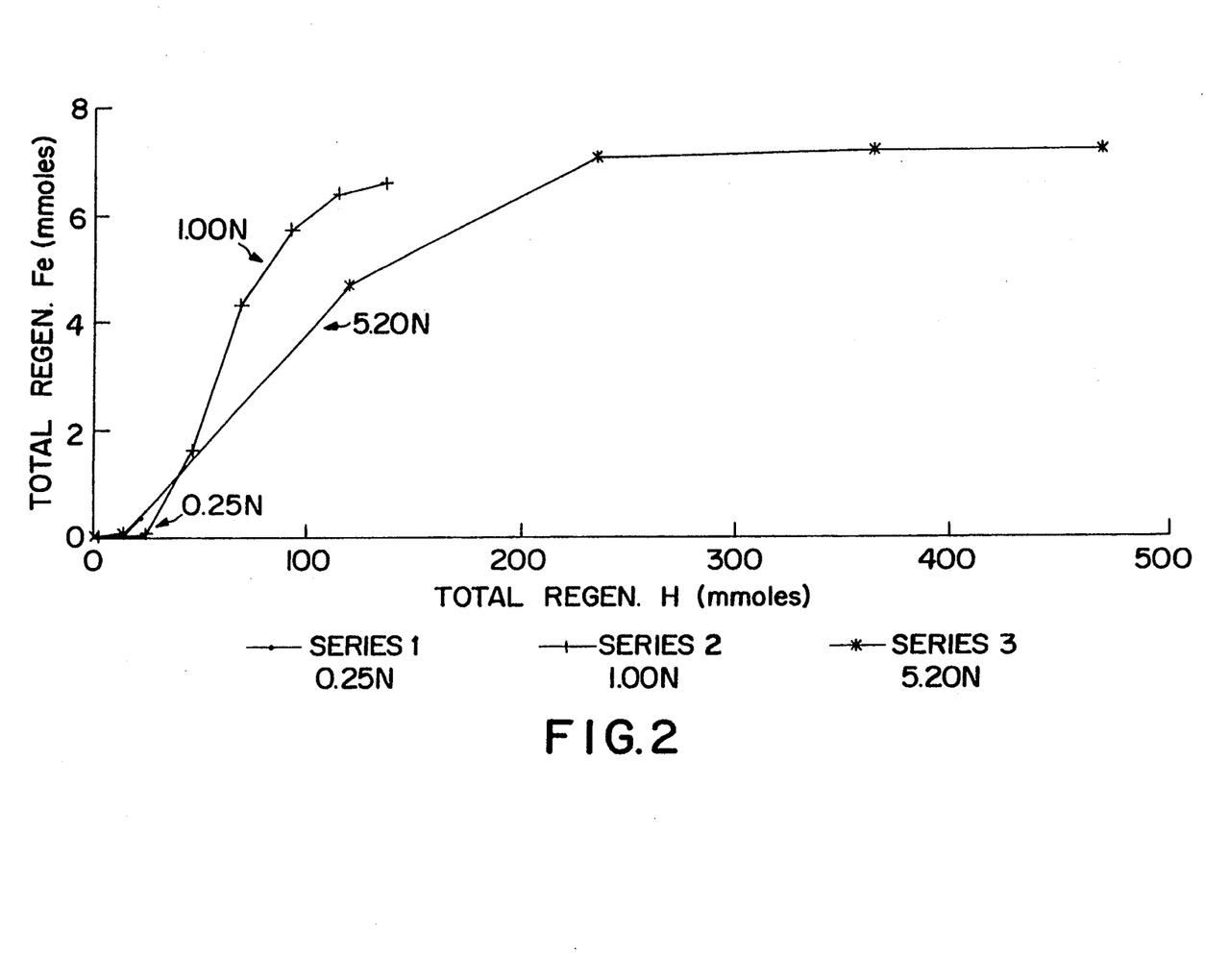
Figure 3:
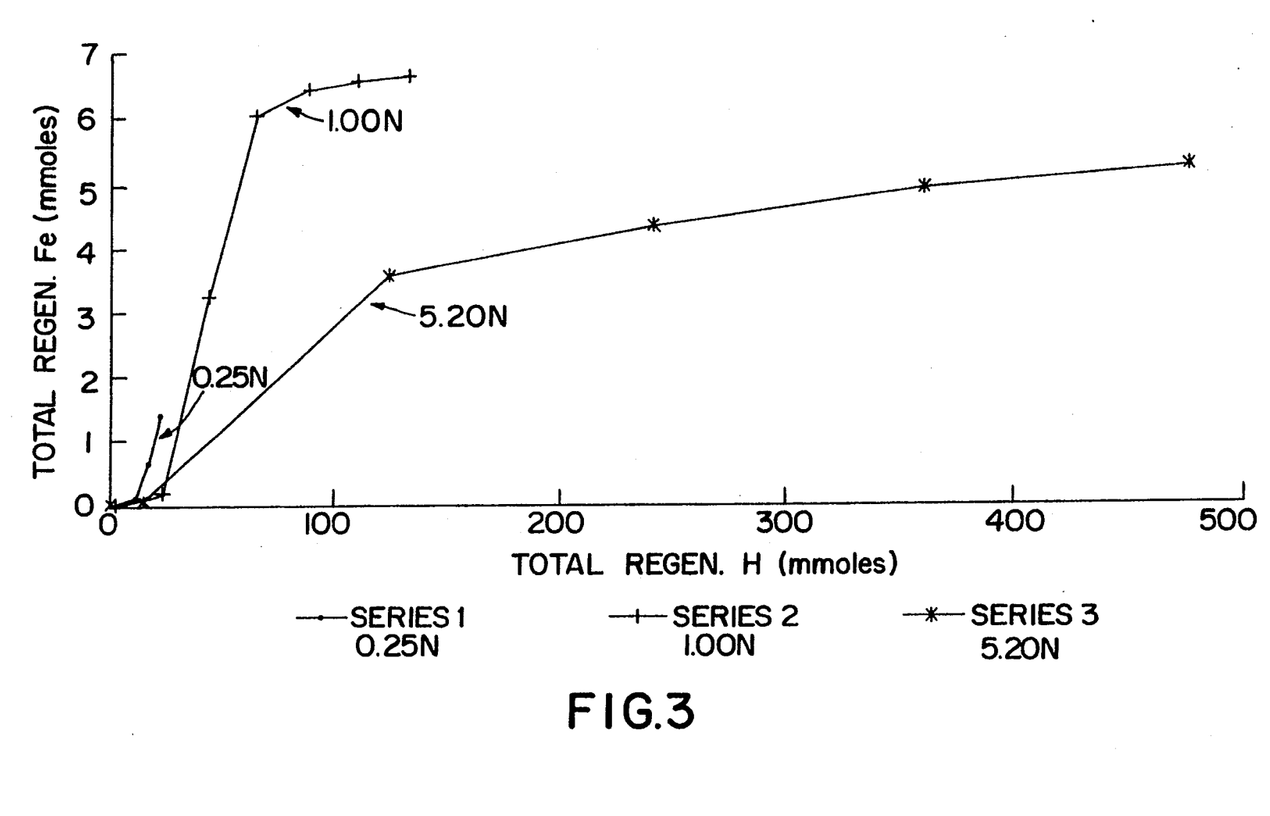

The cumulated amounts of regenerated iron determined as above after each increment of eluant were plotted against the cumulated number of millimoles of acid in the amount of eluant used to produce FIGS. 1–3. Certain features of these Figures are illustrated in Table 1.

The Figures and the data in Table 1 show that, contrary to normal expectations, the regeneration is more efficient with either 0.25 or 1N acids than with the same acids at 5.2N and, it is thus preferred that the regenerating acid not be more concentrated than 2.0N. Also, contrary to expectations and the teachings of the most relevant prior art, hydrochloric and hydrofluoric acids can be, and at relatively low concentrations are, more efficient than sulfuric acid, even though hydrofluoric acid is known not to be nearly as "strong" an acid as sulfuric or hydrochloric because of its lower ionization constant.

As already noted above, it is preferred to formulate the autodeposition composition in most cases with hydrofluoric acid as the only acid constituent, and in such cases, it is preferred to use hydrofluoric acid as the regenerant, in a concentration of from 0.5 to 3%, or more preferably from 1–2.5%. (For comparison, 1N HF is

TABLE 1

| Eluant Composition | Ratio of Millimoles of Iron Regenerated to Milliequivalents of Acid in Eluant Volume Used |
|---|---|
| After 1 Millimole of Iron Total Has Been Eluted | |
| 5.2 N H$_2$SO$_4$ | 0.026 |
| 5.2 N HCl | 0.021 |
| 5.2 N HF | 0.021 |
| 1.0 N H$_2$SO$_4$ | 0.026 |
| 1.0 N HCl | 0.036 |
| 1.0 N HF | 0.036 |
| 0.25 N H$_2$SO$_4$ | <0.03* |
| 0.25 N HCl | 0.051 |
| 0.25 N HF | 0.065 |
| After 5 Millimoles of Iron Total Has Been Eluted | |
| 5.2 N H$_2$SO$_4$ | 0.036 |
| 5.2 N HCl | 0.012 |
| 5.2 N HF | 0.028 |
| 1.0 N H$_2$SO$_4$ | 0.062 |
| 1.0 N HCl | 0.086 |
| 1.0 N HF | 0.079 |

*Value extrapolated from actual data.

very close to 2% by weight

Examples Group 2

In each of the tests in this group, a bed of 60–61 ml of LEWATIT ™ TP-207, PUROLITE ™ S-940, or AMBERLITE ™ 200 sodium form cation exchange resin was loaded into a 45 centimeter deep bed, and then subjected to the following steps:

1. Convert to acid form with 500 ml of 17% aqueous sulfuric acid passed through the bed.
2. Rinse with 500 ml of deionized water.
3. Rinse with 200 ml of 5% aqueous hydrofluoric acid.
4. Rinse with 250 ml of deionized water.
5. Load by flowing through about 900 ml of an autodeposition composition that was the same as Bath Composition I described above except that it also contains sufficient dissolved zinc fluoride to produce a concentration of 0.3 g/L of zinc cations, or alternatively with Bath Composition I itself.
6. Rinse with 2 bed volumes of deionized water.
7. Regenerate with 3 bed volumes of 1% or 10% aqueous hydrofluoric acid or with 2 or 20% aqueous sulfuric acid.
8. Rinse with 2 bed volumes of DI water.

The effluents from the ion exchange resin bed were analyzed to determine the amounts of iron and zinc retained on the ion exchange resin and subsequently eluted. Some results obtained with the autodepositing composition containing zinc and with 10% hydrofluoric acid regenerant are shown in Table 2.

TABLE 2

| Ion Exchange Resin Type | Percent of Metal in the Autodeposition Bath Bound to Ion Exchange Resin for: | | Milligrams per Milliliter of Ion Exchange Resin of Bound: | | Percent of Resin-Bound Metal Removed by Acid Regenerant | |
|---|---|---|---|---|---|---|
| | Fe | Zn | Fe | Zn | Fe | Zn |
| TP-207 | 44 | 78 | 9.9 | 3.8 | 88 | 99+ |
| S-940 | 38 | 73 | 7.3 | 3.2 | 15 | 97 |
| AMBERLITE ® 200 | 98 | 99+ | 26.7 | 5.7 | 81 | 1 |

Notes for Table 2
S-940 Resin has phosphonic acid functional groups; AMBERLITE ® 200 has strong (sulfonic acid) functional groups.

The data in Table 2 show that sulfonic acid type resins are most efficient in binding both iron and zinc, but are relatively difficult to regenerate with hydrofluoric acid, especially for zinc. The phosphonic acid resins are very hard to regenerate from bound iron with 10% hydrofluoric acid.

When Bath Composition I (without zinc) was used, along with both dilute and concentrated hydrofluoric and sulfuric acids and the AMBERLITE® 200 sulfonic acid type resin, the results were notably different. With 10% HF, about 71% of the bound iron was eluted with 2 bed volumes of acid, while with 20% sulfuric acid, about 68% of the bound iron was eluted with the same volume of acid regenerant. With 2 bed volumes of 1% HF regenerant, over 90% of the bound iron was eluted, even though this regenerant contained only one-tenth as many protons as the 10% HF which eluted less. On the other hand, when 2% $H_2SO_2$ was the regenerant, only about 35% of the bound iron was eluted with 2 bed volumes of regenerant. Thus, with strong acid cation exchangers as well as the chelating weak acid ones, hydrofluoric acid can be more effective than a strong acid such as sulfuric in eluting the bound iron.

Examples Group 3

A volume of 19 liters of an autodeposition bath having the same composition as Bath Composition I as defined above, except that the amount of ferric fluoride was increased to give an iron cation concentration of 2.2 g/L, was prepared and passed through a bed with a volume of 1.9 liters of AMBERLITE® IRC-718, iminodiacetic acid cation exchange resin, in its acid form, so as to reduce the concentration of iron in the autodeposition bath to 1.7 g/L. The autodeposition composition that had passed through the cation exchange resin was then used to coat several test panels that aggregated to about 1 square meter of total steel surface. The ion exchange resin was rinsed with 0.8 bed volumes of deionized $H_2O$, regenerated with 1.5 bed volumes of 10% HF, rinsed with 1.6 bed volumes of deionized $H_2O$, and backflushed with deionized $H_2O$ at 4.9 meter/hr. for 10 minutes. The above sequence of steps was repeated ten times with the same cation exchange resin, thereby demonstrating that the exchange capacity of the resin did not diminish with this amount of use which amounted to passage of 100 bed volumes of autodeposition bath through the ion exchange bed. After each repetition, the quality of coating produced was evaluated by conventional salt spray and scab corrosion tests, and the surface quality produced was visually evaluated. There was no deterioration in the corrosion test results after any of the ten repetitions, and no development of grainy or textured surface such as reported under similar conditions of iron removal in U.S. Pat. No. 3,839,097.

Example Group 4

This example group illustrates general principles and a specific example of an integrated process of the invention that enables substantial reductions in the waste of material as compared with currently conventional autodeposition processes.

Figure 4:
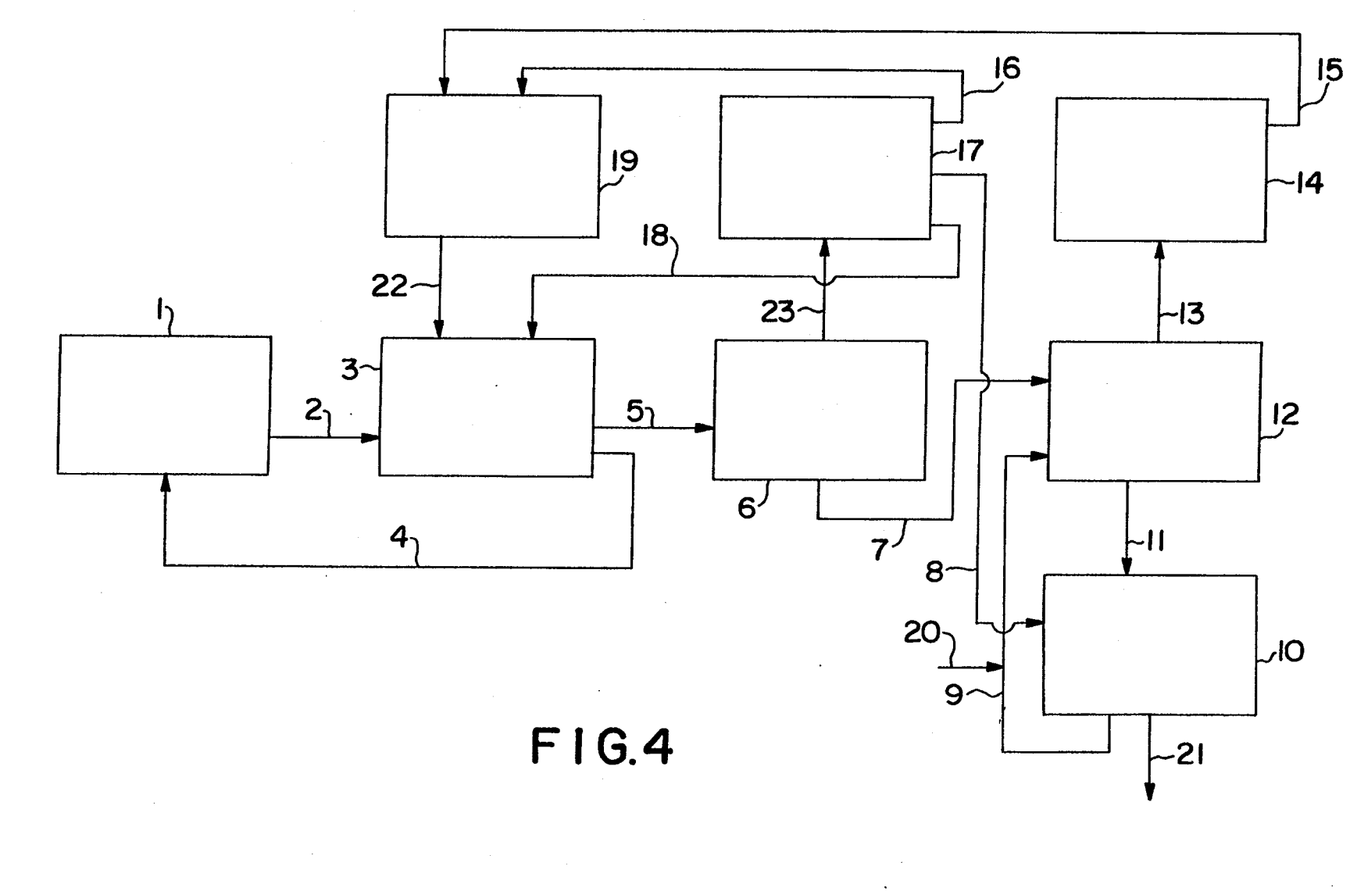
FIG. 4 illustrates one preferred embodiment of the invention which maximizes recycling and thereby minimizes waste of materials used in the autodeposition process.

The process is illustrated in FIG. 4. An autodeposition bath utilizing hydrofluoric acid as its only acid component, such as one of the compositions described above, is used in autodeposition bath container 1 in the figure to deposit a suitable coating on steel parts, thereby introducing dissolved iron into the autodeposition bath. A small fraction per hour, such as 0.5 to 5% per hour, of the total content of the autodeposition bath is continuously withdrawn during operation of the process from container 1 through pipe 2 and introduced to a bed of wet ion exchange resin in its acid form in exchange vessel 3. At first, the liquid displaced from the wet ion exchange resin is substantially water and is directed through pipe 5. However, after about 0.4–0.5 bed volumes of autodeposition bath have been introduced to the top of the wet ion exchange resin in its acid form, liquid with a composition sufficiently similar in composition to the original autodeposition bath, before any iron contamination, to be suitable for return to container 1 emerges from the bottom of the ion exchange bed and is directed through pipe 4 back to container 1 in which the autodeposition process occurs.

When the ion exchange resin in vessel 3 has become sufficiently loaded with iron that it can no longer achieve the desired degree of iron removal, as occurs in one application of practical interest after about 10.7 bed volumes of used autodeposition bath have passed through the ion exchange bed, the flow of autodeposition bath through pipe 2 is temporarily suspended by use of valves not shown. Deionized water is then added to vessel 3 from water reservoir 17 through pipe 18, thereby displacing additional autodeposition bath from the ion exchange resin in vessel 3 through pipe 4 to container 1, where it serves to replenish part of the resin lost by coating and water lost by evaporation from container 1. When the concentration of useful autodeposition bath components in the flow from the bottom of the ion exchange resin bed becomes too dilute to return to container 1 without diluting the composition in that container below its desired value, a result which occurs in the same application as noted above after about 0.4 bed volumes of water have been used, the flow from the bottom of the ion exchange resin bed through pipe 4 is suspended.

If the water supply is plentiful, additional water rinsing is normally continued at this point to maximize the efficiency of regeneration of the ion exchange resin to its acid form, with the flow from the bottom of the ion exchange resin bed being directed through pipe 5; in the particular application being illustrated here, about 2.2 bed volumes are used for this purpose. (Alternatively, slightly more acid regenerant could be used in the next stage of operations.)

When the desired amount of water has been applied as described above to displace the resin content of the autodeposition bath in vessel 3, the outlet to pipe 4 is closed if it is not already closed and the outlet to pipe 5 opened if it is not already open, and aqueous hydrofluoric acid, in the specific example at a concentration of 2.0%, is introduced through pipe 22 from diluter 19 into vessel 3 containing the iron loaded ion exchange resin. When sufficient regenerating acid has passed through the ion exchange resin bed, in the specific example after about 0.8 bed volumes of this regenerating acid, the input is changed to deionized water until a sufficient restoration of the ion exchange resin bed to its wet acid form without excess acid present in the wetting liquid for the resin bed has been achieved; in the specific example, about 2.6 bed volumes are used for this purpose.

The various liquid compositions noted above as directed from vessel 3 through pipe 5 flow into distillation column 6. In the specific example, the resulting aggregated and mixed stream contains about 0.1% HF and 0.3% $FeF_3$, with the balance water. Water vapor from the top of column 6 is collected and condensed and added to the content of reservoir 17, while a water-HF azeotrope containing dissolved $FeF_3$ is removed from the bottom of column 6 through pipe 7 to reactor-distillation column 12, to which concentrated sulfuric acid is added, via input pipe 20 into pipe 9, in sufficient quantity to convert the ferric fluoride content to hydrofluoric acid and ferric sulfate. As solution containing ferric fluoride moves from the outlet of pipe 7 down through reactor-distillation column 12, it reacts with the sulfuric acid to produce ferric sulfate, which has only slight solubility in the concentrated aqueous sulfuric acid solution that exists at the bottom of column 12. Water-hydrofluoric acid azeotrope thus distills from the top of column 12 to reservoir 14, while the bottoms from column 12, consisting of a suspension of ferric sulfate in concentrated sulfuric acid, are led through pipe 11 to filter 10, where the ferric sulfate is removed by filtration, washed with water delivered through pipe 8 from reservoir 17 if desired, to displace acid from the filter cake, and the filter cake is discarded through outlet 21 to waste. The azeotropic hydrofluoric acid from reservoir 14 is led through pipe 15 to diluter 19, where it is mixed with additional water from reservoir 17, added through pipe 16, to produce the aqueous hydrofluoric acid needed for delivery through pipe 22. Wash liquid from the filter is recirculated through pipe 9 to the reactor-distillation column 12, with new additions of sulfuric acid via pipe 20 as needed.

After regeneration is complete, the flow of autodeposition bath through column 3 can be restarted. If desired, all components of FIG. 4 except container 1 can be duplicated, so that the purification of the autodeposition bath can be carried out without interruption; when one ion exchange column is loaded, the flow of autodeposition bath is switched to the alternate one, while the first is being regenerated.

By this method, only the relatively small amounts of iron dissolved from the parts being coated and the amount of sulfuric acid required to convert this iron to ferric sulfate is generally wasted. Except for mechanical losses, no hydrofluoric acid need be wasted, either as such or in the form of ferric fluoride, and the coating resin not actually used to form the autodeposited coating is also recycled. No more than 0.1% per day of the resin not actually coated during continuous operation according to this method needs to be replaced, in contrast to over 30% per day in operations without removal of dissolved iron by ion exchange as described herein.

We claim:

1. A process for forming a non-grainy, non-textured, smooth protective coating containing an organic resin binder on a metal surface and for removing metal cations introduced during the formation of the protective coating from an autodeposition coating composition used to form the protective coating, so as to make the coating composition effective for use to coat additional metal surface, said process comprising steps of:

(I) contacting a metal surface containing at least one metal selected from the group consisting of iron and zinc, and optionally chromium with an autodeposition coating composition comprising water and:

(A) from about 5 to about 550 g/L of a stably dispersed organic coating latex resin;

(B) from about 0.4 to about 5 g/L of fluoride ions;

(C) an amount sufficient to provide from about 0.01 to about 0.2 oxidizing equivalents per liter of an oxidizing agent selected from the group consisting of dichromate, hydrogen peroxide, ferric ions, and mixtures thereof; and (D) a source of hydrogen ions in an amount sufficient to impart to the autodeposition composition a pH in the range from about 1.6 to about 3.8, said contacting being continued for a sufficient time such that the metal surface contacted is covered with a film containing the organic coating latex resin and cations of said metal from the metal surface are dissolved in said autodeposition composition, said film being sufficiently adherent to the metal surface to resist flowing off under the influence of gravity when the coated metal surface is removed from contact with the autodeposition composition and forming said non-grainy, non-textured, smooth coating on the metal surface after drying thereon;

(II) contacting at least 30% of the total volume of the autodeposition composition from the end of step (I), without adding a dispersing agent selected from the group consisting of cationic and amphoteric surfactants and protective colloids thereto, with a sufficient amount of an acid form chelating cation exchange resin to transfer from the autodeposition composition to the cation exchange resin at least part of the content of said dissolved metal cations in the autodeposition composition and substitute an equivalent amount thereto of dissolved hydrogen ions in the autodeposition composition, said cation exchange resin having a saturation capacity at which it can no longer remove said metal cations from the autodeposition composition; and (III) contacting the autodeposition composition from the end of step (II) with additional metal surface containing said metal so as to form on the additional metal surface a non-grainy, non-textured, smooth coating after drying.

2. A process according to claim 1, comprising the additional steps of:

(IV) separating the cation exchange resin used in step (II) from the autodeposition composition contacted with said cation exchange resin in step (II);

(V) contacting the separated cation exchange resin from step (IV) with an aqueous acidic liquid in sufficient quantity for a sufficient time to displace at least a part of said metal cations therefrom and thereby regenerate the exchange capacity of the cation exchange resin; and (VI) contacting said autodeposition composition containing said metal cations with the regenerated acid form cation exchange resin from step (V) for a sufficient time to transfer from the autodeposition composition to the cation exchange resin at least part of the content of said dissolved metal cations in the autodeposition composition and substitute an equivalent amount thereto of dissolved hydrogen ions in the autodeposition composition.

3. A process according to claim 2, wherein (i) the amounts of the autodeposition composition and of the acid form chelating cation exchange resin used in step (II) are such that at the end of step (II) the amount of the total of bound cations of said metal per unit volume of the cation exchange resin is at least 75% of the total amount of bound cations of said metal per unit volume of the cation exchange resin at its saturation capacity; (ii) the amounts of the acid and of the chelating cation exchange resin used in step (V) are such that at the end of step (V) the amount of the total of bound cations of said metal per unit volume of the cation exchange resin is not more than 40% of its saturation capacity; and (iii) in the autodeposition composition, the concentration of stably dispersed organic coating latex resin is from 40 to 120 g/L, the concentration of fluoride ions is from 0.5 to 3.0 g/L, the concentration of oxidizing equivalents per liter is from 0.011 to 0.09 and is selected from the group consisting of hydrogen peroxide, ferric ions, and mixtures thereof, and the pH is from 1.7 to 3.0.

4. A process according to claim 3, wherein (i) the amounts of the autodeposition composition and of the acid form chelating cation exchange resin used in step (II) are such that at the end of step (II) the amount of the total of bound cations of said metal per unit volume of the cation exchanger resin is at least 90% of the total amount of bound cations of said metal per unit volume of the cation exchange resin at its saturation capacity; (ii) the amounts of the acid and of the chelating cation exchange resin used in step (V) are such that at the end of step (v) the amount of the total of bound cations of said metal per unit volume of the ion exchange resin is not more than 25% of its saturation capacity; and (iv) in the autodeposition composition, the concentration of stably dispersed organic coating latex resin is from 40 to 80 g/L, the concentration of fluoride ions is from 1.0 to 3.0 g/L, the concentration of oxidizing equivalents per liter is from 0.012 to 0.045 and is selected from the group consisting of hydrogen peroxide, ferric ions, and mixtures thereof, the pH is from 1.8 to 2.5, and the total concentration of all anions other than fluoride and surfactant anions is not more than 1 g/L.

5. A process according to claim 4, wherein (i) the stably dispersed organic coating latex resin in the autodeposition composition is selected from the group consisting of (a) polymers and copolymers of vinylidene chloride that contain at least 80% by weight of residues from vinylidene chloride and (b) copolymers of acrylonitrile; (ii) the time of contact in step (I) is from 30 to 200 seconds; (iv) the cation exchange resin has iminodiacetic acid functional groups in its acid form; and (v) the aqueous acidic liquid used in step (V) consists essentially of water and acids selected from the group consisting of hydrofluoric acid, hydrochloric acid, and sulfuric acid in a total amount such that the aqueous acidic liquid is not more concentrated than 2.0N in acid.

6. A process according to claim 3, wherein (i) the stably dispersed organic coating latex resin in the autodeposition composition is selected from the group consisting of (a) polymers and copolymers of vinylidene chloride that contain at least 80% by weight of residues from vinylidene chloride and (b) copolymers of acrylonitrile; (ii) the time of contact in step (I) is from 30 to 200 seconds; (iv) the cation exchange resin has iminodiacetic acid functional groups in its acid form; and (v) the aqueous acidic liquid used in step (V) consists essentially of water and acids selected from the group consisting of hydrofluoric acid, hydrochloric acid, and sulfuric acid in a total amount such that the aqueous acidic liquid is not more concentrated than 2.0N in acid.

7. A process according to claim 3, wherein (i) the stably dispersed organic coating latex resin in the autodeposition composition is selected from the group consisting of (a) polymers and copolymers of vinylidene chloride that contain at least 80% by weight of residues from vinylidene chloride and (b) copolymers of acrylonitrile; (ii) the time of contact in step (I) is from 30 to 200 seconds; (iv) the cation exchange resin has iminodiacetic acid functional groups in its acid form; and (v) the aqueous acidic liquid used in step (V) consists essentially of water and acids selected from the group consisting of hydrofluoric acid, hydrochloric acid, and sulfuric acid in a total amount such that the aqueous acidic liquid is not more concentrated than 2.0N in acid.

8. A process according to claim 7, wherein (i) the contacting in step (I) is by immersion of the metal surface in a principal container for the autodeposition composition; (ii) a portion of the autodeposition composition in the principal container therefor is continuously removed from said principal container and transported to a separate container wherein step (II) is completed, said portion being sufficiently large that a volume equal to at least 1% of the total volume of autodeposition composition in the principal container is removed during each hour; (iii) autodeposition composition from the end of step (II) is continuously returned to the principal container for the autodeposition composition and mixed therein with the remainder of the autodeposition composition therein; and (iv) the aqueous acidic liquid regenerant consists essentially of water and from 0.5–3.0% by weight of hydrofluoric acid.

9. A process according to claim 6, wherein (i) the contacting in step (I) is by immersion of the metal surface in a principal container for the autodeposition composition; (ii) a portion of the autodeposition composition in the principal container therefor is continuously removed from said principal container and transported to a separate container wherein step (II) is completed, said portion being sufficiently large that a volume equal to at least 1% of the total volume of autodeposition composition in the principal container is removed during each hour; (iii) autodeposition composition from the end of step (II) is continuously returned to the principal container for the autodeposition composition and mixed therein with the remainder of the autodeposition composition therein; and (iv) the aqueous acidic liquid regenerant consists essentially of water and from 0.5–3.0% by weight of hydrofluoric acid.

10. A process according to claim 5, wherein (i) the contacting in step (I) is by immersion of the metal surface in a principal container for the autodeposition composition; (ii) a portion of the autodeposition composition in the principal container therefor is continuously removed from said principal container and transported to a separate container wherein step (II) is completed, said portion being sufficiently large that a volume equal to at least 1% of the total volume of autodeposition composition in the principal container is removed during each hour; (iii) autodeposition composition from the end of step (II) is continuously returned to the principal container for the autodeposition composition and mixed therein with the remainder of the autodeposition composition therein; and (iv) the aqueous acidic liquid regenerant consists essentially of water and from 0.5–3.0% by weight of hydrofluoric acid.

11. A process according to claim 4, wherein (i) the contacting in step (I) is by immersion of the metal surface in a principal container for the autodeposition composition; (ii) a portion of the autodeposition composition in the principal container therefor is continuously removed from said principal container and transported to a separate container wherein step (II) is completed, said portion being sufficiently large that a volume equal to at least 1% of the total volume of autodeposition composition in the principal container is removed during each hour; (iii) autodeposition composition from the end of step (II) is continuously returned to the principal container for the autodeposition composition and mixed therein with the remainder of the autodeposition composition therein; and (iv) the aqueous acidic liquid regenerant consists essentially of water and from 0.5–3.0% by weight of hydrofluoric acid.

12. A process according to claim 3, wherein (i) the contacting in step (I) is by immersion of the metal surface in a principal container for the autodeposition composition; (ii) a portion of the autodeposition composition in the principal container therefor is continuously removed from said principal container and transported to a separate container wherein step (II) is completed, said portion being sufficiently large that a volume equal to at least 1% of the total volume of autodeposition composition in the principal container is removed during each hour; (iii) autodeposition composition from the end of step (II) is continuously returned to the principal container for the autodeposition composition and mixed therein with the remainder of the autodeposition composition therein; and (iv) the aqueous acidic liquid regenerant consists essentially of water and from 0.5–3.0% by weight of hydrofluoric acid.

13. A process according to claim 2, wherein (i) the contacting in step (I) is by immersion of the metal surface in a principal container for the autodeposition composition; (ii) a portion of the autodeposition composition in the principal container therefor is continuously removed from said principal container and transported to a separate container wherein step (II) is completed, said portion being sufficiently large that a volume equal to at least 1% of the total volume of autodeposition composition in the principal container is removed during each hour; (iii) autodeposition composition from the end of step (II) is continuously returned to the principal container for the autodeposition composition and mixed therein with the remainder of the autodeposition composition therein; and (iv) the aqueous acidic liquid regenerant consists essentially of water and from 0.5–3.0% by weight of hydrofluoric acid.

14. A process according to claim 1, wherein (i) the contacting in step (I) is by immersion of the metal surface in a principal container for the autodeposition composition; (ii) a portion of the autodeposition composition in the principal container therefor is continuously removed from said principal container and transported to a separate container wherein step (II) is completed, said portion being sufficiently large that a volume equal to at least 1% of the total volume of autodeposition composition in the principal container is removed during each, hour; (iii) autodeposition composition from the end of step (II) is continuously returned to the principal container for the autodeposition composition and mixed therein with the remainder of the autodeposition composition therein; and (iv) the aqueous acidic liquid regenerant consists essentially of water and from 0.5–3.0% by weight of hydrofluoric acid.

15. A process for forming a non-grainy, non-textured, smooth protective coating containing an organic resin binder on a metal surface and for removing metal cations introduced during the formation of the protective coating from an autodeposition coating composition used to form the protective coating, so as to make the coating composition effective for use to coat additional metal surface, said process comprising steps of:

(I) contacting a metal surface containing at least one metal selected from the group consisting of iron and zinc and optionally chromium with an autodeposition composition comprising not more than 1 g/L in total of anions other than fluoride and surfactant anions, said contacting being continued for a sufficient time that the metal surface contacted is covered with a film containing the organic coating resin and cation of said metal from the metal surface which are dissolved in the autodeposition composition, said film being sufficiently adherent to the metal surface to resist flowing off under the influence of gravity when the coated metal surface is removed from contact with the autodeposition composition and forming said non-grainy, non-textured, smooth coating on the metal surface after drying thereon;

(II) contacting at least 30% of the total volume of the autodeposition composition from the end of step (I), without adding a dispersing agent selected from the group consisting of cationic and amphoteric surfactants and protective colloids thereto, with a sufficient amount of an acid form chelating cation exchange resin to transfer from the autodeposition composition to the cation exchange resin at least part of the total content of said dissolved cations of said metal in the autodeposition composition and substitute an equivalent amount thereto to dissolved hydrogen ions in the autodeposition composition;

(III) separating the cation exchange resin used in step (II) from the autodeposition composition contacted with said cation exchange resin in step (II);

(IV) contacting the separated cation exchange resin from step (III) with an aqueous acidic liquid consisting essentially of water and hydrofluoric acid in sufficient quantity for a sufficient time to displace at least a part of said metal cations therefrom and thereby regenerate the exchange capacity of the cation exchange resin; and (V) contacting an autodeposition composition comprising said metal cations and not more than 1 g/L in total of anions other than fluoride and surfactant anions, without adding a dispersing agent selected from the group consisting of cationic and amphoteric surfactants and protective colloids thereto, with the regenerated acid form cation exchange resin from step (IV) for a sufficient time to transfer from the autodeposition composition to the cation exchange resin at least part of the content of said dissolved cations of said metal in the autodeposition composition and substitute and equivalent amount thereto of dissolved hydrogen ions in the autodeposition composition.

16. A process according to claim 15, wherein (i) the autodeposition composition in each of steps (I) and (V) comprises a total of no more than 0.3 g/L of anions other than fluoride and surfactant anions and (ii) at least 55% of the total volume of the autodeposition composition is contacted with acid form cation exchange resin in step (II).

17. A process according to claim 16, wherein (i) the autodeposition composition in each of steps (I) and (V) comprises a total of no more than 0.1 g/L of anions other than fluoride and surfactant anions and (ii) at least 90% of the total volume of the autodeposition composition is contacted with acid form cation exchange resin in step (II).

18. A process according to claim 17, wherein the time of contact in each of steps (I) and (V) is from 30–200 seconds.

19. A process according to claim 15, wherein the time of contact in each of steps (I) and (V) is from 30–200 seconds.

20. A process for regenerating a cation exchange resin, said process comprising the steps of:
(I) providing a wet bed of iminodiacetic acid cation exchange resin containing between 0.10 and 0.30 millimoles per milliliter of wet resin bed volume of a total of iron and zinc and optionally chromium cations bound thereon by exchange from an autodeposition composition earlier contacted with the cation exchange resin, the cation exchange resin at the beginning of contact having been predominantly in its acid form, the volume being measured when the bed has settled to its equilibrium volume under the influence of natural gravity and mild mechanical agitation in the absence of any flow of liquid through the bed with from one half to four total bed volumes of purified water after the passage of a liquid comprising said autodeposition composition through the bed; and
(II) adding to the top of the wet bed provided in step (I) a volume of an aqueous acidic regenerant liquid consisting essentially of water and an acid component selected from the group consisting of sulfuric acid, hydrofluoric acid, hydrochloric acid, and mixtures thereof, so as to cause a volume of eluted liquid equal to the volume of regenerant liquid added to flow from the bottom of the wet bed, the volume and composition of the regenerant liquid being selected so that the volume of elated liquid contains at least 0.080 millimoles per milliliter of wet resin bed volume of a total of said cations dissolved therein and the total moles of said cations displaced from binding to the cation exchange resin into the total volume of eluted liquid is at least equal to 0.070 times the number of equivalents of acid in the volume of regenerant liquid added to the wet bed.

* * * * *

UNITED STATES PATENT AND TRADEMARK OFFICE
CERTIFICATE OF CORRECTION

PATENT NO. : 5,409,737
DATED : Apr. 25, 1995
INVENTOR(S) : William G. Kozak, Bashir M. Ahmed It is certified that error appears in the above-indentified patent and that said Letters Patent is hereby corrected as shown below:

In col. 5, line 3, delete "batch" and insert --bath--.

In col. 9, line 3, delete "winking" and insert --working--.

In col. 22, line 21, delete "elated" and insert --eluted--.

Signed and Sealed this

Third Day of September, 1996

Attest:

BRUCE LEHMAN

Attesting Officer     Commissioner of Patents and Trademarks